Oct. 23, 1962  B. F. BREGI ETAL  3,059,544
GEAR FINISHING MACHINE
Filed May 14, 1958  3 Sheets-Sheet 1

INVENTORS
BENJAMIN F. BREGI
ARTHUR B. BASSOFF
BY Whittemore, Hulbert
& Belknap ATTORNEYS Oct. 23, 1962  B. F. BREGI ETAL  3,059,544
GEAR FINISHING MACHINE Filed May 14, 1958  3 Sheets-Sheet 2

INVENTORS
BENJAMIN F. BREGI
BY ARTHUR B. BASSOFF
*Whittemore, Hulbert*
*& Belknap* ATTORNEYS

INVENTORS
BENJAMIN F. BREGI
ARTHUR B. BASSOFF
BY
ATTORNEYS

United States Patent Office 3,059,544
Patented Oct. 23, 1962

3,059,544
GEAR FINISHING MACHINE
Benjamin F. Bregi, Grosse Pointe, and Arthur B. Bassoff, Detroit, Mich., assignors to National Broach & Machine Company, Detroit, Mich., a corporation of Michigan
Filed May 14, 1958, Ser. No. 735,277
24 Claims. (Cl. 90—1.6)

The present invention relates to a gear finishing machine, and more particularly, to a machine designed to carry out an operation known as gear honing.

It is an object of the present invention to provide a gear finishing machine of the character described including means for effecting a very accurate circumferential adjustment between a gear and meshed gear-like hone.

More specifically, it is an object of the present invention to provide a gear finishing machine operable to support a gear and gear-like tool at crossed axes, in which the angular relationship between the gear and tool may be changed, means for driving both the gear and tool in accurately timed relationship, and means for effecting a relative circumferential timing adjustment between the gear and tool to cause controlled engagement between one side or the other of the teeth of the gear.

It is a further object of the present invention to provide a gear finishing machine comprising a work spindle, a tool spindle, means mounting one of said spindles for adjustment toward and away from the other spindle, means mounting one of said spindles for angular adjustment about a common normal to the axes of said spindles, means for effecting relative traverse between said spindles in a plane parallel to the axes of both of said spindles, means for driving both of said spindles in accurately timed relationship, and means for effecting a circumferential timing adjustment between said spindles.

Other objects and features of the invention will become apparent as the description proceeds, especially when taken in conjunction with the accompanying drawings, illustrating preferred embodiments of the invention, wherein.

The present invention relates to crossed axes gear finishing in which a work gear is rotated in mesh with a gear-like tool, the tooth surfaces of the tool being adapted to machine the flanks of the teeth of the work gear. The machining operation may be a shaving operation in which case the flanks of the teeth of the tool are grooved or serrated to provide cutting edges. The machining operation may be a honing operation in which the teeth of the tool are formed of a hard but somewhat yieldable abrasive material.

In the past, gear shaving and gear honing have usually been carried out in an operation in which either the gear or the tool is directly driven, the other member being driven through its intermeshing engagement therewith.

According to the present invention, the gear and tool are mounted on spindles both of which are positively driven in accurately timed relationship. With this arrangement it will be understood that if clearance or backlash is present, the gear and tool may be rotated at substantial speed without actually contacting each other. In accordance with the present invention a circumferential timing adjustment is provided for one of the spindles or its supported part so that during rotation at substantial speeds, the teeth of the tool may be moved toward and into contact with one side or the other of the teeth of the gear. Thus, if spacing errors exist, the circumferential timing adjustment may be carried out to bring the teeth of the tool into contact only with one or more teeth of the tool which are improperly spaced. By making the circumferential timing adjustment very slow, material may be removed from the sides of the work gear under accurately controlled conditions without the possibility of developing excessive pressure. On the other hand, by making the circumferential timing adjustment more rapid, extremely high pressures may if desired be developed between the teeth of the gear and tool.

Figure 1:
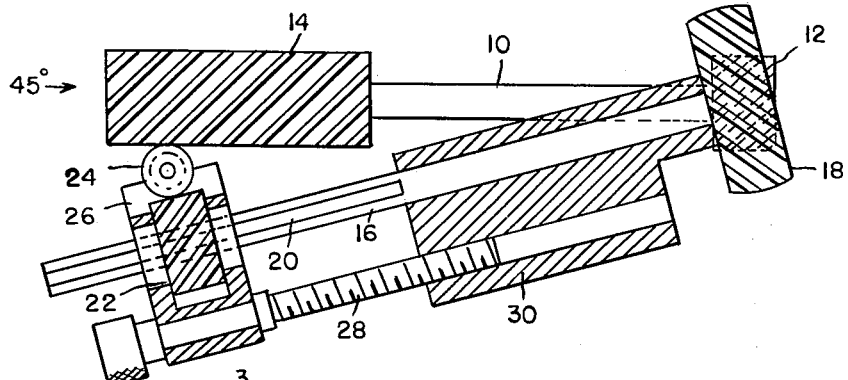
FIGURE 1 is a schematic plan view of a drive means for rotating a pair of angularly related spindles.
Figure 2:
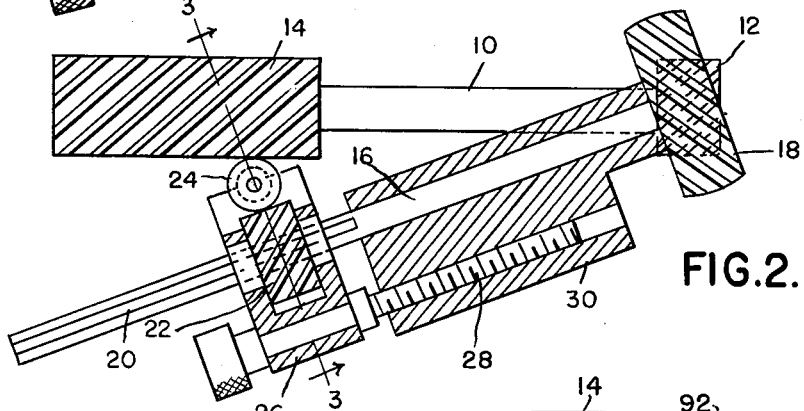
FIGURE 2 is a view similar to FIGURE 1 showing angular adjustment between the spindles.
Figure 3:
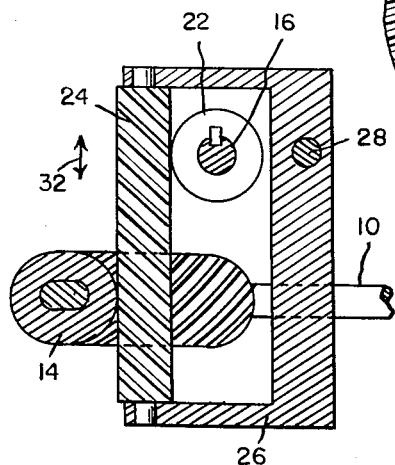
FIGURE 3 is a sectional view on the line 3—3, FIGURE 2.

Referring now to FIGURES 1–3 there is diagramatically illustrated a shaft or spindle 10 which is designated as the work spindle and is adapted to carry a work gear 12. Connected to the shaft 10 is an elongated gear 14 which may conveniently be a helical gear having a helix angle of approximately 45 degrees. Located in a crossing position with respect to the spindle 10 is a tool spindle 16 carrying a gear-like tool 18. The tool spindle 16 is splined as indicated at 20 and slidably mounted on the splines is a gear 22 which is also a helical gear of approximately 45 degrees helix angle. Disposed between the gears 14 and 22 and in meshing engagement with both is a gear 24 mounted on a slidable carrier 26 which is adjustable longitudinally of the tool spindle 16 by an adjusting screw 28 extending into a threaded opening in a support 30. Power is applied to the system to rotate the gears and conveniently, to the gear 14 connected to the work spindle 10. It will be observed by comparing FIGURES 1 and 2 that the angle between the work spindle 10 and the tool spindle 16 may be angularly adjusted by moving the carrier 26 longitudinally of the tool spindle 16. This has the effect of moving the gear 22 along the splines 20 of the tool spindle 16 and also carries the intermediate gear 24, which is always in mesh with the gear 22, to a different position of mesh with the elongated gear 14.

Referring now to FIGURE 3 it will be observed that the gear 24 is also elongated so that the conditions previously described may continue to prevail throughout a relative adjustment between the shafts 10 and 16 in the direction of the arrow 32. This adjustment is required as occasioned by the sizes of the work gears 12 and tools 18.

Figure 6A:
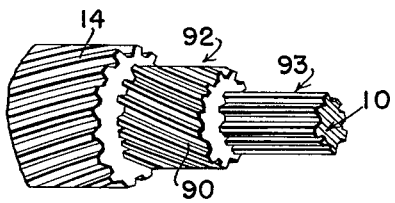
FIGURE 6A is an enlarged fragmentary view of the splined sleeve, gear and spindle shown at the left in FIGURE 6.
Figure 4:
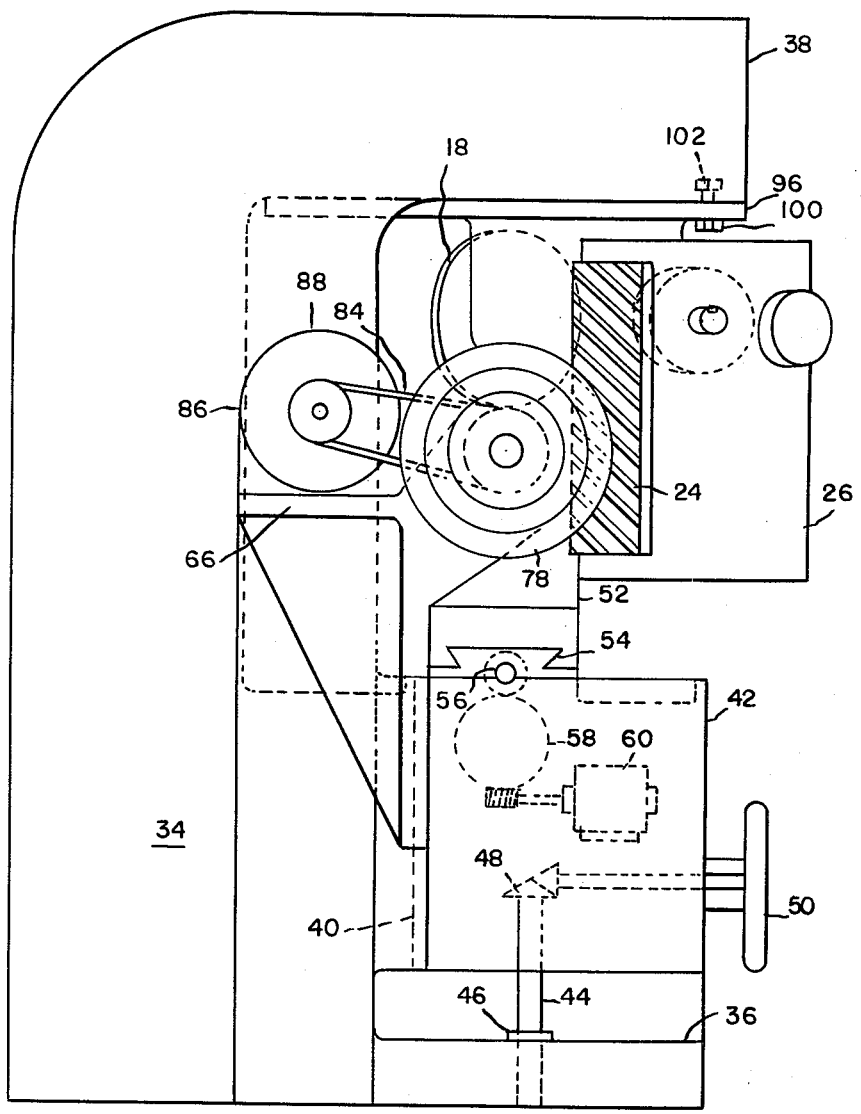
FIGURE 4 is an elevational view of a machine embodying the principles illustrated in FIGURES 1–3.
Figure 5:
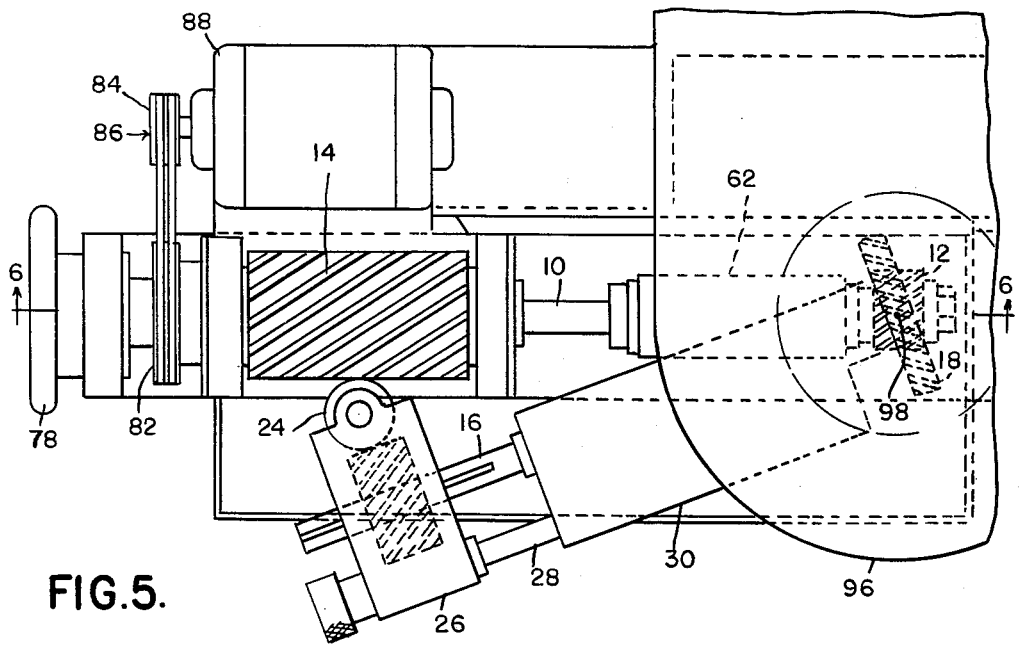
FIGURE 5 is a plan view of the machine shown in FIGURE 4.
Figure 6:
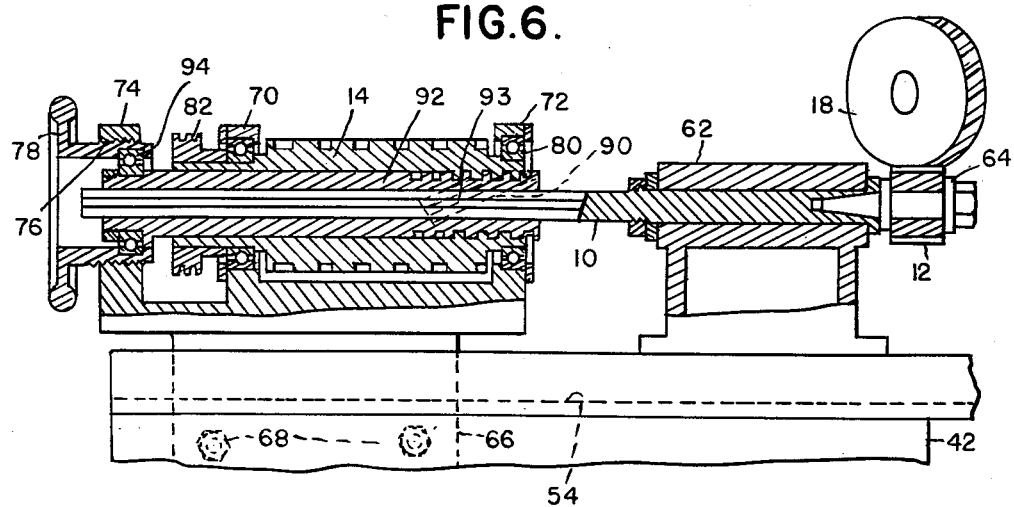
FIGURE 6 is a fragmentary sectional view on the line 6—6, FIGURE 5.

Referring now to FIGURES 4–6 there is illustrated a machine built to incorporate the features diagrammatically illustrated in FIGURES 1–3. In FIGURES 4–6 the machine comprises a frame 34 including a base portion 36 and an overhanging head portion 38. Mounted on ways indicated at 40 at the front of the machine is a vertically adjustable knee 42 the adjustment of which is here indicated as including a vertical feed screw 44 engaged in a nut 46 carried by the base 36. The feed screw 44 is shown as driven through bevel gearing 48 from a hand wheel 50.

At the top of the knee 42 there is provided a work support 52 mounted for horizontal adjustment on ways 54 provided at the top of the knee 42. Means are provided for effecting traverse of the work support 52 and this means comprises a feed screw 56 driven through gearing indicated at 58 from a motor 60.

The work support 52, as best illustrated in FIGURE 6, includes a bearing 62 through which the work spindle 10 extends and in this figure the work gear 12 is shown as supported on a stub arbor 64 in mesh with the tool 12. A bracket 66 is bolted to the knee 42 as indicated at 68 and this bracket includes spaced bearing supports 70 and 72 and a post 74 having a threaded opening 76 for the reception of a hand wheel 78. Mounted in bearings 80 in the bearing supports 70 and 72 is the gear 14 which transmits rotation to the work spindle 10. Fixed to one end of the gear 14 is a sheave 82 adapted to be connected by a belt 84 to a driving pulley or sheave 86 carried by a motor 88 mounted on the bracket 66.

As shown best in FIGURE 6A, the gear 14 is provided at its inner surface with helical splines shaped to slidably interfit with helical splines 90 formed on the exterior of a tubular adjustment sleeve 92. The adjustment sleeve 92 at its inner surface is provided with straight splines slidably interfitting with straight splines 93 formed on the exterior of spindle 10.

While as illustrated, the spline connection between the sleeve 92 and the gear 14 is helical, whereas the spline connection between the sleeve 92 and the work spindle 10 is straight, it will be appreciated that the only requirement is that the two spindle connections extend at a different helix angle both of which may if desired be helical.

The adjustment sleeve 92 at the left hand end as seen in FIGURE 6, is connected through a bearing 94 to the hand wheel 78. Accordingly, with the foregoing structure, power applied to the sheave 82 drives the work gear 12 in rotation, torque being transmitted from the sheave to the gear 14 through the sleeve 92 to the shaft 10. If it is desired to effect a circumferential timing adjustment of the gear 12 relative to the tool 18, the hand wheel 78 is turned causing axial advance of the adjustment sleeve 92 and hence, an incremental circumferential timing adjustment of the work spindle 10. Since, as previously described, the gear 14 is in positively geared relationship with respect to the tool spindle 16, this circumferential timing adjustment takes place between the work gear 12 and the tool 18. This adjustment may be a very delicate adjustment measured in thousandths of an inch even though the gear and the tool may be rotating at very substantial speeds.

Referring again to FIGURES 4 and 5 it will be observed that the support 30, which carries the tool spindle 16 is angularly adjustable. For this purpose the support 30 is carried by a circular mounting plate 96 which is carried by the undersurface of the overhanging portion 38 and is adapted to be adjusted about a vertical axis passing through the point 98 which represents a line perpendicular to the axes of both the gear and tool and which hence, is referred to as the common normal. The plate 96 may be secured in adjusted position by screws 100 engageable with nuts received in arcuate T-slots 102.

From the foregoing it will be observed that there is provided a mechanism for supporting a gear and a gear-like tool in mesh at crossed axes, with provision for angular adjustment to vary the crossed axes setting and with provision for adjustment parallel to the common normal to the axes of the gear and tool to accommodate different sizes of gear and tool as well as to effect a feeding adjustment if desired. Means are provided for positively driving the work spindle and direct gearing is provided which connects the work spindle and tool spindle so that the two spindles are driven in accurately timed relationship. In addition, means are provided effective in all different positions of adjustment of the work and tool support spindles and operable during timed rotation of the two spindles for effecting a circumferential timing adjustment between the two spindles so as to cause a tool carried by the tool spindle to move circumferentially in either direction as desired toward the teeth of the work gear. The foregoing mechanism provides a means by which the contact between a rapidly rotating work gear and gear-like tool may be controlled with great accuracy and delicacy. The invention is particularly useful in an operation known as gear honing where the honing tool is essentially an abrasive tool and is not capable of withstanding severe shocks or relatively great pressure. The present machine provides means by which the teeth of the honing tool may be brought into light contact with the teeth of the gear and moved relative thereto circumferentially in a timing adjustment so as to apply whatever pressure is required or so as to effect a removal of stock which is carefully controlled as to depth. It may be pointed out that if eccentricity is present in the work gear, it may be substantially removed since the initial contact between the teeth of the gear and tool are at one side only of the gear.

The operation may be carried out with the gear and tool at crossed axes or with the axes parallel if desired. When the axes of the gear and tool are crossed in space, the contact between the teeth of the gear and tool is ordinarily limited to a relatively small zone adjacent the center of crossed axes, unless the teeth of the hone are longitudinally concave so as to have extended lengthwise bearing. Where the contact with the teeth of the gear is limited in extent, it is desirable to effect a traverse of the gear which as shown, is accomplished by movement of the work support on the ways 54.

The drawings and the foregoing specification constitute a description of the improved gear finishing machine in such full, clear, concise and exact terms as to enable any person skilled in the art to practice the invention, the scope of which is indicated by the appended claims.

What we claim as our invention is:

1. A gear finishing machine comprising a frame, a first spindle mounted for rotation on said frame, a sleeve splined to said spindle, a first gear splined to said sleeve with splines of an angle different from that of the splines connecting said spindle and sleeve, a second spindle mounted for rotation on said frame, a second gear connected in driving relation to said second spindle, means connecting said first and second gears, power means for driving said gears and spindles in timed relation, and means for adjusting said sleeve axially during rotation thereof.

2. A gear finishing machine comprising a frame, a first spindle mounted for rotation on said frame, a sleeve splined to said spindle, a first gear splined to said sleeve with splines of an angle different from that of the splines connecting said spindle and sleeve, a second spindle mounted for rotation on said frame, a second gear connected in driving relation to said second spindle, a third gear connecting said first and second gears, power means for driving said gears and spindles in timed relation, and means for adjusting said sleeve axially during rotation thereof.

3. A gear finishing machine comprising a frame, a first spindle mounted for rotation on said frame, a sleeve splined to said spindle, a first gear splined to said sleeve with splines of an angle different from that of the splines connecting said spindle and sleeve, a second spindle mounted for rotation on said frame, a second gear connected in driving relation to said second spindle, a third gear having its axis substantially perpendicular to the axes of said first and second gears, power means for driving said gears and spindles in timed relation, and means for adjusting said sleeve axially during rotation thereof.

4. A rotatable spindle, a sleeve slidably mounted on said spindle, splines acting between said sleeve and spindle to prevent relative rotation therebetween, a gear slidably mounted on said sleeve, splines operable between said gear and sleeve to prevent relative rotation therebetween without relative longitudinal movement between said gear and sleeve, said splines being in different angular relation with the axis of said sleeve, and means operably associated with said sleeve for adjusting said sleeve longitudinally with respect to said gear and spindle whereby relative rotation of said gear with respect to said spindle is accomplished.

5. The structure as claimed in claim 4 wherein said last mentioned means comprises a rotatable cylindrical member threadedly engaged with said support for axial movement with respect thereto, said cylindrical member being in axial alignment with said sleeve, and an annular bearing concentric with and engaging both said cylindrical member and said sleeve to produce axial movement of said sleeve relative to said gear on rotation of said cylindrical member.

6. A gear finishing machine comprising a frame, a work spindle on said frame, a tool spindle on said frame, means for relatively adjusting said spindles toward and away from each other, means for relatively adjusting said spindles about an axis perpendicular to both of said spindles, gears connecting said spindles for timed rotation in all positions of adjustment, power drive means including said gears for rotating said spindles, and sleeve means slidably positioned between one of said gears and spindles for selectively effecting a circumferential timing adjustment between said spindles during rotation thereof while said spindles are maintained axially stationary.

7. A gear finishing machine comprising a frame, a work spindle on said frame, a tool spindle on said frame, means for relatively adjusting said spindles toward and away from each other, means for relatively adjusting said spindles about an axis perpendicular to both of said spindles, gears connecting said spindles for timed rotation in all positions of adjustment, power drive means including said gears for rotating said spindles, and splined sleeve means slidably positioned between said work spindle and one of said gears for selectively effecting a circumferential timing adjustment between said spindles during rotation thereof while said spindles are maintained axially stationary.

8. A gear finishing machine comprising a work spindle, a tool spindle, first and second gears connected in driving relation to said spindles, gearing connecting said first and second gears, an internally and externally splined adjustment sleeve disposed between one of said gears and its associated spindle, and means for adjusting said sleeve longitudinally independently of said one gear and its associated spindle during rotation thereof.

9. A gear finishing machine comprising a frame, a first spindle mounted for rotation on said frame, a sleeve splined to said spindle, a first elongated gear splined to said sleeve with splines of an angle different from that of the splines connecting said spindle and sleeve, a second spindle mounted for rotation on said frame, a second gear connected in driving relation to said second spindle, a third gear having its axis substantially perpendicular to the axes of said first and second gears and in mesh therewith, power means for driving said gears and spindles in timed relation, and means for adjusting said sleeve axially during rotation thereof.

10. A gear finishing machine comprising a frame, a first spindle mounted for rotation on said frame, a sleeve splined to said spindle, a first elongated gear splined to said sleeve with splines of an angle different from that of the splines connecting said spindle and sleeve, a second spindle mounted for rotation on said frame, a second gear splined to said second spindle, a third gear also elongated having its axis substantially perpendicular to the axes of said first and second gears and in mesh therewith, power means for driving said gears and spindles in timed relation, and means for adjusting said sleeve axially relative to said first gear and spindle during rotation of said spindles, said second gear and said third gear being mounted in mesh on a carrier therefor, and means for adjusting said carrier longitudinally of said second spindle.

11. A gear finishing machine comprising a frame, a work spindle on said frame, a tool spindle on said frame, means for relatively adjusting said spindles toward and away from each other, means for relatively adjusting said spindles about an axis perpendicular to both of said spindles, a first gear mounted on said work spindle, a second gear mounted on said tool spindle and a third gear between and in mesh with said first and second gears whereby said spindles are positively driven in timed relation in all positions of adjustment.

12. The structure as set forth in claim 11 wherein said first gear is elongated and said third gear is adapted to move longitudinally thereof to maintain the first and third gears in mesh in all relative angular positions of the spindles due to adjustment thereof about said axis perpendicular to the spindles.

13. Structure as set forth in claim 12 wherein said third gear is also elongated whereby the third gear is maintained in mesh with both the first and second gears on relative adjustment of the spindles toward and away from each other.

14. The structure as set forth in claim 13 wherein said second gear and said third gear are mounted in mesh on a carrier and said second gear is splined to the tool spindle and further including means for adjusting the carrier longitudinally of the tool spindle.

15. A gear finishing machine comprising a frame, a work spindle on said frame, a tool spindle on said frame, means for relatively adjusting said spindles toward and away from each other, means for relatively adjusting said spindles about an axis perpendicular to both of said spindles, gears connecting said spindles for timed rotation in all positions of adjustment, power drive means including said gears for rotating said spindles, one of said gears and spindles being concentric and means operably connected with said one of said gears and spindles for selectively effecting a continuous circumferential timing adjustment between said spindles during rotation thereof while said spindles are maintained axially stationary, comprising an internally and externally splined adjustment sleeve between said one concentric gear and spindle, the splines of said sleeve being of different angles and means for adjusting said sleeve axially relative to said one spindle.

16. A gear finishing machine comprising a frame, a work spindle on said frame, a tool spindle on said frame, means for relatively adjusting said spindles toward and away from each other, means for relatively adjusting said spindles about an axis perpendicular to both of said spindles, gears connecting said spindles for timed rotation in all positions of adjustment, including a first gear mounted on said work spindle, a second gear connected to said tool spindle, and a third gear between and in mesh with said first and second gears, power drive means including said gears for rotating said spindles, and means operably connected to one of said gears and spindles for selectively effecting a continuous circumferential timing adjustment between said spindles during rotation thereof while said spindles are maintained axially stationary.

17. A gear finishing machine comprising a frame, a work spindle on said frame, a tool spindle on said frame, means for relatively adjusting said spindles toward and away from each other, means for relatively adjusting said spindles about an axis perpendicular to both of said spindles, gears connecting said spindles for time rotation in all positions of adjustment, including a first gear mounted on said work spindle, a second gear connected to said tool spindle, and a third gear between and in mesh with said first and second gears, one of said first and second gears being elongated, the other of said first and second gears and said third gear being mounted in mesh on a carrier, said other gear being splined to its associated spindle and means for adjusting said carrier longitudinally of said associated spindle, power drive means including said gears for rotating said spindles and means operably connected to one of said gears and spindles for selectively effecting a continuous circumferential timing adjustment between said spindles during rotation thereof while said spindles are maintained axially stationary.

18. A gear finishing machine comprising a frame, a work spindle on said frame, a tool spindle on said frame, means for relatively adjusting said spindles toward and away from each other, means for relatively adjusting said spindles about an axis perpendicular to both of said spindles, gears connecting said spindles for timed rotation in all positions of adjustment, one of said gears and spindles being concentric, power drive means including said gears for rotating said spindles, and means operable between said one of said gears and spindles for selectively effecting a continuous circumferential timing adjustment between said spindles during rotation thereof while said spindles are maintained axially stationary including an adjustment sleeve having internal and external splines positioned between said one gear and spindle, the internal splines being parallel with and the external splines being inclined at an angle to the axis of said sleeve, and means for adjusting said sleeve axially relative to said one gear and spindle.

19. A gear finishing machine comprising a frame, a work spindle on said frame, a tool spindle on said frame, means for relatively adjusting said spindles toward and away from each other, means for relatively adjusting said spindles about an axis perpendicular to both of said spindles, gears connecting said spindles for timed rotation in all positions of adjustment including a first gear mounted on said tool spindle, a second gear mounted on said work spindle and a third gear between and in mesh with said first and second gears, power drive means including said gears for rotating said spindles, and means operably connected to one of said gears and spindles for selectively effecting a continuous circumferential timing adjustment between said spindles during rotation thereof while said spindles are maintained axially stationary.

20. A gear finishing machine comprising a frame, a work spindle on said frame, a tool spindle on said frame, means for relatively adjusting said spindles toward and away from each other, means for relatively adjusting said spindles about an axis perpendicular to both of said spindles, gears connecting said spindles for timed rotation in all positions of adjustment including a first elongated gear mounted on said work spindle, a second gear mounted on said tool spindle, and a third gear between and in mesh with said first and second gears, power drive means including said gears for rotating said spindles, and means operably connected to one of said gears and spindles for selectively effecting a continuous circumferential timing adjustment between said spindles during rotation thereof while said spindles are maintained axially stationary.

21. A gear finishing machine comprising a frame, a work spindle on said frame, a tool spindle on said frame, means for relatively adjusting said spindles toward and away from each other, means for relatively adjusting said spindles about an axis perpendicular to both of said spindles, gears connecting said spindles for timed rotation in all positions of adjustment including a first elongated gear mounted on said work spindle, a second gear mounted on said tool spindle and a third gear also elongated positioned between and in mesh with said first and second gears, power drive means including said gears for rotating said spindles, and means operably connected to one of said gears and spindles for selectively effecting a continuous circumferential timing adjustment between said spindles during rotation thereof while said spindles are maintained axially stationary.

22. A gear finishing machine comprising a frame, a work spindle on said frame, a tool spindle on said frame, means for relatively adjusting said spindles toward and away from each other, means for relatively adjusting said spindles about an axis perpendicular to both of said spindles, a carrier mounted on one of said spindles for movement axially thereof, gears connecting said spindles for timed rotation in all positions of adjustment including a first gear connected to said work spindle, a second gear connected to said tool spindle, and a third gear between and in mesh with said first and second gears, one of said first and second gears being elongated, the other of said first and second gears and said third gear being mounted in mesh on the carrier, said other gear being splined to its associated spindle, power drive means including said gears for rotating said spindles, and means operably connected to one of said gears and spindles for selectively effecting a continuous circumferential timing adjustment between said spindles during rotation thereof while said spindles are maintained axially stationary.

23. A gear finishing machine comprising a frame, a work spindle on said frame, a tool spindle on said frame, means for relatively adjusting said spindles toward and away from each other, means for relatively adjusting said spindles about an axis perpendicular to both of said spindles, a carrier mounted on one of said spindles for movement axially thereof, gears connecting said spindles for timed rotation in all positions of adjustment including a first gear connected to said work spindle, a second gear splined to said tool spindle, and a third gear between and in mesh with said first and second gears, said first gear being elongated, said second and third gears being mounted in mesh on the carrier, power drive means including said gears for rotating said spindles, and means operably connected to one of said gears and spindles for selectively effecting a continuous circumferential timing adjustment between said spindles during rotation thereof while said spindles are maintained axially stationary.

24. A gear finishing machine comprising a frame, a work spindle on said frame, a tool spindle on said frame, means for relatively adjusting said spindles toward and away from each other, means for relatively adjusting said spindles about an axis perpendicular to both of said spindles, a carrier mounted on one of said spindles for movement axially thereof, gears connecting said spindles for timed rotation in all positions of adjustment including a first gear connected to said work spindle, a second gear splined to said tool spindle and a third gear between and in mesh with said first and second gears, said first and third gears being elongated, said second and third gears being mounted in mesh on the carrier, power drive means including said gears for rotating said spindles, and means operably connected to one of said gears and spindles for selectively effecting a continuous circumferential timing adjustment between said spindles during rotation thereof while said spindles are maintained axially stationary.

References Cited in the file of this patent

UNITED STATES PATENTS

| | | |
|---|---|---|
| 1,005,538 | Greaves | Oct. 10, 1911 |
| 1,759,333 | Wildhaber | May 20, 1930 |
| 2,112,996 | Perkins | Apr. 5, 1938 |
| 2,270,831 | Drummond | Jan. 20, 1942 |
| 2,280,045 | Miller | Apr. 14, 1942 |
| 2,335,215 | Schurr | Nov. 23, 1943 |
| 2,362,763 | Miller | Nov. 14, 1944 |
| 2,528,242 | Praeg | Oct. 31, 1950 |
| 2,660,929 | Praeg | Dec. 1, 1953 |
| 2,780,146 | Saari | Feb. 5, 1957 |
| 2,851,930 | Praeg | Sept. 16, 1958 |
| 2,863,360 | Praeg | Dec. 9, 1958 |
| 2,888,858 | Moncrieff | June 2, 1959 |